US012536740B2

(12) United States Patent
Do et al.

(10) Patent No.: US 12,536,740 B2
(45) Date of Patent: Jan. 27, 2026

(54) PROVIDING AWARENESS OF PRIVACY-RELATED ACTIVITIES IN VIRTUAL AND REAL-WORLD ENVIRONMENTS

(71) Applicant: AUTODESK, INC., San Francisco, CA (US)

(72) Inventors: Youngwook Do, Atlanta, GA (US); Fraser Anderson, Toronto (CA); Frederik Brudy, Toronto (CA); George William Fitzmaurice, Toronto (CA)

(73) Assignee: AUTODESK, INC., San Francisco, CA (US)

( * ) Notice: Subject to any disclaimer, the term of this patent is extended or adjusted under 35 U.S.C. 154(b) by 190 days.

(21) Appl. No.: 18/458,924

(22) Filed: Aug. 30, 2023

(65) Prior Publication Data

US 2024/0331281 A1     Oct. 3, 2024

Related U.S. Application Data

(60) Provisional application No. 63/493,285, filed on Mar. 30, 2023.

(51) Int. Cl.
*G02B 27/00*     (2006.01)
*G02B 27/01*     (2006.01)
*G06T 17/00*     (2006.01)

(52) U.S. Cl.
CPC .......... *G06T 17/00* (2013.01); *G02B 27/0172* (2013.01)

(58) Field of Classification Search
None
See application file for complete search history.

(56) References Cited

U.S. PATENT DOCUMENTS 11,302,027 B2 *  4/2022  Keen ................. G06F 3/167
11,783,552 B2 * 10/2023  Ulbricht ............ A63F 13/213
                                                           345/633

(Continued)

OTHER PUBLICATIONS

Extended European Search Report for Application No. 24167105.6 dated Aug. 7, 2024.

(Continued)

*Primary Examiner* — Martin Mushambo
(74) *Attorney, Agent, or Firm* — Artegis Law Group, LLP

(57) ABSTRACT

One embodiment of the present invention sets forth a technique for providing awareness of privacy-related activities. The technique includes determining a privacy level associated with a user of an extended reality environment. The technique also includes presenting, using an internal display of a headset, one or more internal indicators identifying a location of a bystander located in a real-world environment, wherein a level of detail of each internal indicator is based on the privacy level associated with the user. The technique further includes presenting, using an external display, one or more external indicators that include a monitoring indicator representing being captured by the headset and presented to the user via the headset, and further include a user activity indicator representing one or more activities of the user, wherein a level of detail of the user activity indicator is based on the privacy level associated with the user.

20 Claims, 6 Drawing Sheets

(3 of 6 Drawing Sheet(s) Filed in Color)

(56) References Cited

U.S. PATENT DOCUMENTS

| | | | | |
|---|---|---|---|---|
| 2009/0019553 | A1* | 1/2009 | Narayanaswami | H04L 63/10 726/28 |
| 2019/0320138 | A1* | 10/2019 | Kaufthal | G06V 40/168 |
| 2021/0286502 | A1* | 9/2021 | Lemay | H04N 13/368 |
| 2023/0237192 | A1* | 7/2023 | Kahan | G06V 10/60 726/1 |

OTHER PUBLICATIONS

Gottsacker et al., "Exploring Cues and Signaling to Improve Cross-Reality Interruptions", IEEE International Symposium on Mixed and Augmented Reality Adjunct, DOI 10.1109/ISMAR-Adjunct57072.2022.00179, Oct. 17, 2022, pp. 827-832.

Ahmad et al., "Tangible Privacy: Towards User-Centric Sensor Designs for Bystander Privacy", Association for Computing Machinery, https://doi.org/10.1145/3415187, vol. 4, No. CSCW2, Article 116, Oct. 2020, pp. 116:1-116:28.

Alharbi et al., "To Mask or Not to Mask? Balancing Privacy with Visual Confirmation Utility in Activity-Oriented Wearable Cameras", https://doi.org/10.1145/3351230, vol. 3, No. 3, Article 72, Sep. 2019, pp. 72:1-72:29.

Balebako et al., "The Impact of Timing on the Salience of Smartphone App Privacy Notices", SPSM'15, DOI: http://dx.doi.org/10.1145/2808117.2808119, Oct. 12, 2015, pp. 63-74.

Baudisch et al., "Halo: a Technique for Visualizing Off-Screen Locations", Interaction Techniques for Constrained Displays, vol. 5, Issue 1, Apr. 5-10, 2003, pp. 481-488.

Cranor, Lorrie Faith, "Necessary But Not Sufficient: Standardized Mechanisms for Privacy Notice and Choice", J. On Telecomm. & High Tech. L, vol. 10, 2012, pp. 273-308.

Denning et al., "In Situ with Bystanders of Augmented Reality Glasses: Perspectives on Recording and Privacy-Mediating Technologies", http://dx.doi.org/10.1145/2556288.2557352, 2014, 10 pages.

Do et al., "Smart Webcam Cover: Exploring the Design of an Intelligent Webcam Cover to Improve Usability and Trust", Association for Computing Machinery, https://doi.org/10.1145/3494983, vol. 5, No. 4, Article 154, Dec. 2021, pp. 154:1-154:21.

Dourish et al., "Security In the Wild: User Strategies For Managing Security As An Every day, Practical Problem", DOI 10.1007/s00779-004-0308-5, vol. 8, Jul. 6, 2004, pp. 391-401.

Ens et al., "Candid Interaction: Revealing Hidden Mobile and Wearable Computing Activities", DOI: http://dx.doi.org/10.1145/2807442.2807449, UIST '15, Nov. 8-11, 2015, pp. 467-476.

Gaw et al., "Secrecy, Flagging, and Paranoia: Adoption Criteria in Encrypted E-Mail", Apr. 22-27, 2006, pp. 591-600.

George et al., "Should I Interrupt or Not? Understanding Interruptions in Head-Mounted Display Settings", DOI: https://doi:org/10:1145/3322276:3322363, Jun. 23-28, 2019, 14 pages.

George et al., "Seamless, Bi-directional Transitions along the Reality-Virtuality Continuum: A Conceptualization and Prototype Exploration", IEEE International Symposium on Mixed and Augmented Reality, DOI 10.1109/ISMAR50242.2020.00067, 2020, pp. 412-424.

Ghosh et al., "NotifiVR: Exploring Interruptions and Notifications in Virtual Reality", IEEE Transactions on Visualization and Computer Graphics, DOI: 10.1109/TVCG.2018.2793698, vol. 24, No. 4, Apr. 2018, pp. 1447-1456.

Gottsacker et al., "Diegetic Representations for Seamless Cross-Reality Interruptions", 2021, 10 pages.

Grubert et al., "The Office of the Future: Virtual, Portable and Global", 2018, 10 pages.

Hakkila et al., "Design Probes Study on User Perceptions of a Smart Glasses Concept", The 14th International Conference on Mobile and Ubiquitous Multimedia, DOI: http://dx.doi.org/10.1145/2836041.2836064, Nov. 30-Dec. 2, 2015, pp. 223-233.

Koelle et al., "Beyond LED Status Lights—Design Requirements of Privacy Notices for Body-worn Cameras", Shapechanging Textiles & Interactive Materials, DOI: https://doi.org/10.1145/3173225.3173234, Mar. 18-21, 2018, pp. 177-187.

Kudo et al., "Towards Balancing VR Immersion and Bystander Awareness", In Proceedings of the ACM on Human-Computer Interaction, https://doi.org/10.1145/3486950, vol. 5, Article 484, Nov. 2021, pp. 484:1-484:22.

Langheinrich, Marc, "Privacy by Design—Principles of Privacy-Aware Ubiquitous Systems", LNCS, 2001, pp. 273-291.

Ledo et al., "Evaluation Strategies for HCI Toolkit Research", https://doi.org/10.1145/3173574.3173610, Apr. 21-26, 2018, pp. 1-17.

Mai et al., "Feeling Alone in Public—Investigating the Influence of Spatial Layout on Users' VR Experience", DOI: https://doi:org/10:1145/3240167:3240200, Sep. 29-Oct. 3, 2018, pp. 1-13.

Mathis et al., "Prototyping Usable Privacy and Security Systems: Insights from Experts", International Journal of Human-Computer Interaction, DOI: 10.1080/10447318.2021.1949134, Aug. 5, 2021, pp. 1-24.

Mathis et al., "RubikAuth: Fast and Secure Authentication in Virtual Reality", DOI: https://doi.org/10.1145/3334480.3382827, Apr. 25-30, 2020, pp. 1-9.

Mcgill et al., "A Dose of Reality: Overcoming Usability Challenges in VR Head-Mounted Displays", http://dx.doi.org/10.1145/2702123.2702382, Apr. 18-23, 2015, pp. 2143-2152.

Medeiros et al., "Promoting Reality Awareness in Virtual Reality through Proxemics", 2021, 10 pages.

Meta, "Meta Quest 2: Immersive All-In-One VR Headset", Meta Store, Retrieved from https://store.facebook.com/ca/quest/products/quest-2/, on Sep. 4, 2023, 7 pages.

Emami-Naeini et al., "Privacy Expectations and Preferences in an IoT World", Thirteenth Symposium on Usable Privacy and Security, USENIX Association, Jul. 12-14, 2017, pp. 399-412.

Ofek et al., "Towards a Practical Virtual Office for Mobile Knowledge Workers", arXiv:2009.02947, Sep. 7, 2020, 7 pages.

O'Hagan et al., "Exploring Attitudes Towards Increasing User Awareness of Reality From Within Virtual Reality", ACM International Conference on Interactive Media Experiences, https://doi.org/10.1145/3505284.3529971, Jun. 22-24, 2022, pp. 151-160.

O'Hagan et al., "Surveying Consumer Understanding & Sentiment Of VR", In International Workshop on Immersive Mixed and Virtual Environment Systems, https://doi.org/10.1145/3458307.3460965, Sep. 28-Oct. 1, 2021, 8 pages.

O'Hagan et al., "Reality Aware VR Headsets", Session 1: Wearable Pervasive Displays, Association for Computing Machinery, https://doi.org/10.1145/3393712.3395334, 2020, 9 pages.

O'Hagan et al., "Safety, Power Imbalances, Ethics and Proxy Sex: Surveying In-The-Wild Interactions Between VR Users and Bystanders", 2021, 10 pages.

Portnoff et al., "Somebody's Watching Me? Assessing the Effectiveness of Webcam Indicator Lights", Social Media and Mobile Camera Privacy, http://dx.doi.org/10.1145/2702123.2702164, Apr. 18-23, 2015, pp. 1649-1658.

Redmon et al., "YOLOv3: An Incremental Improvement", arXiv:1804.02767, Apr. 8, 2018, 6 pages.

"Ricoh Theta S", Ltd Ricoh Company, Retrieved from https://theta360.com/en/about/theta/s.html, on Sep. 4, 2023, 14 pages.

Rietzler et al., "VaiR: Simulating 3D Airflows in Virtual Reality", Interactions in Virtual Reality, DOI: http://dx.doi.org/10.1145/3025453.3026009, May 6-11, 2017, pp. 5669-5677.

Rossi et al., "Transparency By Design in Data-Informed Research: A Collection Of Information Design Patterns", Computer Law & Security Review, vol. 37, https://doi.org/10.1016/j.clsr.2020.105402, 2020, pp. 1-22.

Schaub et al., "Designing Effective Privacy Notices and Controls", Usable Security, IEEE Internet Computing, May/Jun. 2017, pp. 70-77.

Schaub et al., "A Design Space for Effective Privacy Notices", Symposium on Usable Privacy and Security, USENIX Association, Jul. 22-24, 2015, pp. 1-17.

Schneider et al., "ReconViguRation: Reconfiguring Physical Keyboards in Virtual Reality", arXiv:1907.08153, Jul. 18, 2019, pp. 1-12.

(56) References Cited

OTHER PUBLICATIONS

Schwind et al., "Virtual Reality on the Go? A Study on Social Acceptance of VR Glasses", https://doi.org/10.1145/3236112.3236127, Sep. 3-6, 2018, pp. 111-118.

Simeone, Adalberto L., "The VR Motion Tracker: Visualising Movement of Non-Participants in Desktop Virtual Reality Experiences", IEEE 2nd Workshop on Everyday Virtual Reality, 2016, 4 pages.

Starner, Thad, "The Challenges Of Wearable Computing: Part 2", Jul.-Aug. 2001, pp. 54-67.

Richter, Felix, "AR & VR Adoption Is Still in Its Infancy", Virtual and Augmented Reality, Jun. 2, 2023, 7 pages.

Steil et al., "PrivacEye: Privacy-Preserving Head-Mounted Eye Tracking Using Egocentric Scene Image and Eye Movement Features", arXiv:1801.04457, Jun. 25-28, 2019, pp. 1-16.

Sunshine et al., "Crying Wolf: An Empirical Study of SSL Warning Effectiveness", Aug. 10-14, 2009, 18th USENIX Security Symposium, 2009, pp. 1-18.

Willich et al., "You Invaded my Tracking Space! Using Augmented Virtuality for Spotting Passersby in Room-Scale Virtual Reality", DOI: https://doi.org/10.1145/3322276.3322334, Jun. 23-28, 2019, pp. 1-10.

Whitten et al., "Why Johnny Can't Encrypt: A Usability Evaluation of PGP 5.0", In Proceedings of the 8th USENIX Security Symposium, Aug. 1999, pp. 169-183.

Williamson et al., "PlaneVR: Social Acceptability of Virtual Reality for Aeroplane Passengers", https://doi.org/10.1145/3290605.3300310, May 4-9, 2019, pp. 1-14.

Yang et al., "ShareSpace: Facilitating Shared Use of the Physical Space by both VR Head-Mounted Display and External Users", Session 10: Navigation, Association of Computing Machinery, https://doi.org/10.1145/3242587.3242630, Oct. 14-17, 2018, pp. 499-509.

Zhu et al., "BlinKey: A Two-Factor User Authentication Method for Virtual Reality Devices", Association for Computing Machinery, https://doi.org/10.1145/3432217, vol. 4, No. 4, Article 164, Dec. 2020, pp. 164:1-164:29.

Rettinger et al., "Do You Notice Me? How Bystanders Affect the Cognitive Load in Virtual Reality", In 2022 IEEE Conference on Virtual Reality and 3D User Interfaces, DOI 10.1109/VR51125.2022.00025, 2022, pp. 77-82.

\* cited by examiner

PROVIDING AWARENESS OF PRIVACY-RELATED ACTIVITIES IN VIRTUAL AND REAL-WORLD ENVIRONMENTS

CROSS REFERENCE TO RELATED APPLICATIONS

This application claims benefit of the United States Provisional Patent Application titled "BALANCING BYSTANDER AND VR USER PRIVACY THROUGH AWARENESS CUES INSIDE AND OUTSIDE VR," filed Mar. 30, 2023, and having Ser. No. 63/493,285. The subject matter of this related application is hereby incorporated herein by reference.

BACKGROUND

Field of the Various Embodiments

Embodiments of the present disclosure relate generally to immersive computing environments and, more specifically, to providing awareness of privacy-related activities in virtual and real-world environments.

Description of the Related Art

Extended reality environments, such as Virtual Reality (VR) and Augmented Reality (AR) environments, are types of immersive environments that use a headset to present an audiovisual representation of a virtual environment to a user wearing the headset. A person wearing the headset is referred to herein as user of the immersive computing environment. The headset presents images on a display screen visible to the user, and can also produce sound using speakers. The images are rendered by a computing device, which can be located in the headset. The images include representations of virtual objects and/or virtual characters such as avatars. The virtual characters can represent other people in the real-world environment who are physically located near the user and are detected by sensors such as a camera mounted on the headset. Other people in the real-world environment are referred to herein as "bystanders." Bystanders can be people who can be seen or heard by the user, or can see or hear the user, for example.

The headset camera can capture an image of the real-world environment, and the headset can display the camera image to the VR user as a view of the real-world environment. However, the headset camera and microphone can observe and record video and/or audio of bystanders, and therefore can cause privacy concerns among the bystanders. Further, the headset camera can record the video of a bystander, or a headset microphone can eavesdrop on a bystander without the bystander knowing that they are being observed, overheard, and/or recorded.

The privacy of bystanders can be compromised by the camera or optical passthrough window on a headset. The headset can provide the user with a view of the real-world environment. For example, a passthrough video feature can be activated on a headset. The passthrough video uses the headset camera to provide a view of the real-world environment, including depictions of objects and other people who are bystanders in the environment. As another example, a transparent portion of the headset can provide a view of a portion of the real-world environment in the field of vision of the user.

Bystanders can be unaware that they are being observed or recorded and potentially being incorporated into a simulated immersive environment. For example, bystanders who do not see the headset are not informed that they are being observed or recorded. Even if bystanders do see the headset, they can be unaware that the headset is capable of capturing or recording images or video of the real-world environment.

The headset camera and microphone are not always active. For example, when a VR user is immersed in a VR environment and there is no need to display information about the real-world environment, the headset camera and microphone are deactivated. However, bystanders in the real-world environment who see a user wearing a headset can believe that they are being observed or recorded by the headset even though the camera or microphone is inactive.

One approach that has been implemented to inform bystanders that they are being observed or captured by a camera on a headset is to provide a Light-Emitting Diode (LED) on the headset that illuminates when a headset camera is being used to capture video of the real-world environment. However, the LED indicator is relatively small and is unlikely to be seen clearly by bystanders who are not in close physical proximity to the headset user. Further, bystanders can be unaware of the presence or meaning of the LED indicator, so the LED indicator is not an effective way to inform bystanders that they are being observed or captured by a camera on the headset.

Further, the privacy of the user wearing a headset can be sensitive to real-world bystanders that are in the physical environment. A bystander can overhear or otherwise observe a user without the user being aware that the bystander is present in the real-world environment. For example, a bystander standing to the side of or behind the user can be difficult to see or hear because the headset blocks the peripheral vision and/or hearing of the user wearing the headset. A passthrough video feature or a transparent portion of the headset can enable the user to see a portion of the real-world environment, but the visible portion can be smaller than the field of view of the user without the headset.

As the foregoing illustrates, what is needed in the art are more effective techniques for providing indications to users of an immersive environment of privacy-related activities by bystanders, and also for providing awareness of bystander presence to the users of the immersive environment.

SUMMARY

One embodiment of the present invention sets forth a technique for providing awareness of privacy-related activities. The technique includes determining a privacy level associated with a user of an extended reality environment. The technique also includes presenting, using an internal display of a headset, one or more internal indicators identifying a location of a bystander located in a real-world environment, wherein a level of detail of each internal indicator is based on the privacy level associated with the user. The technique further includes presenting, using an external display, one or more external indicators that include a monitoring indicator depicting at least a portion of information presented on the internal display of the headset.

One technical advantage of the disclosed techniques relative to the prior art is that users of the immersive virtual environment are informed by information displayed in their headset of the presence and location of bystanders who are present in the real-world environment. The user is thus made aware that their speech, for example, is not necessarily private. Further, the user can control the amount or level of detail of information presented in the headset by specifying a privacy level, so that users who are more concerned with privacy at a particular time can increase the amount of information presented about the presence of bystanders, for example.

Another technical advantage of the disclosed techniques relative to the prior art is that bystanders in the proximity of a user wearing a headset are informed by information displayed on a display device when they are being monitored by the headset. The information displayed on the display device can be the same information displayed to the user in the headset. Bystanders are thus made aware that their actions and speech are not necessarily private. Information about activities being performed by the user, which can be relevant to the privacy of bystanders, can also be presented on the display device to inform bystanders of how the images or video captured by the headset are being used in the immersive virtual environment. These technical advantages provide one or more technological improvements over prior art approaches.

BRIEF DESCRIPTION OF THE DRAWINGS

The patent or application file contains at least one drawing executed in color. Copies of this patent or patent application publication with color drawing(s) will be provided by the Office upon request and payment of the necessary fee. So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one of skill in the art that the inventive concepts may be practiced without one or more of these specific details.

System Overview

Figure 1:
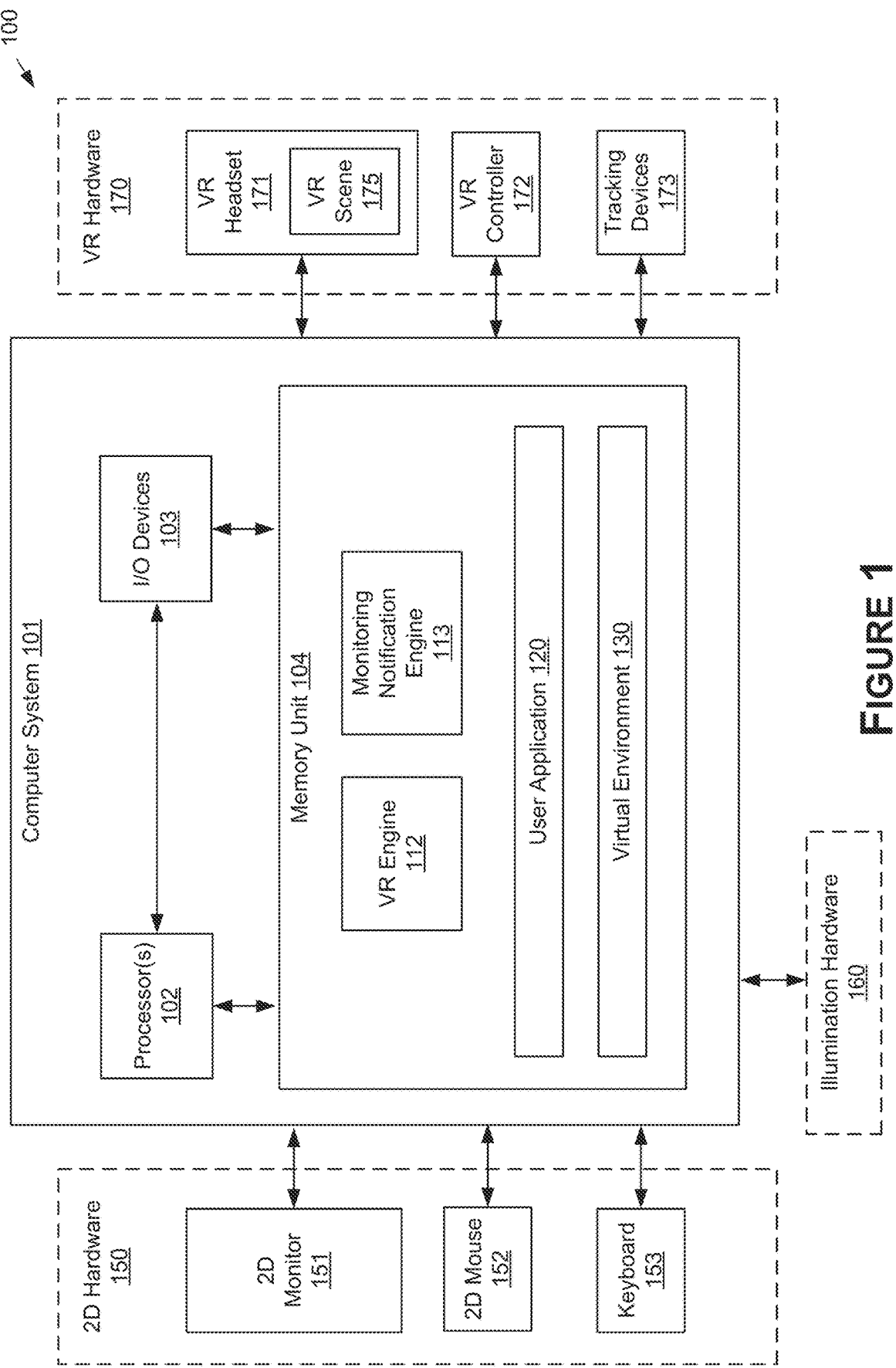
FIG. 1 illustrates a privacy-sensitive monitoring notification system configured to implement one or more aspects of various embodiments.

FIG. 1 illustrates a privacy-sensitive monitoring notification system 100 configured to implement one or more aspects of various embodiments. As shown, the privacy-sensitive monitoring notification system 100 includes, without limitation, a computer system 101 connected to various 2D hardware 150, various VR hardware 170, and Illumination hardware 160. The computer system 101 can comprise at least one processor 102, input/output (I/O) devices 103, and a memory unit 104 coupled together. The computer system 101 can comprise a server, personal computer, laptop or tablet computer, mobile computer system, or any other device suitable for practicing various embodiments described herein. Connections between computer system 101 and hardware components such as 2D hardware 150, VR hardware 170, and/or Illumination hardware 160 can be wireless or wired. Wireless connections can use suitable wireless communication protocols such as BLUETOOTH, WIFI, or the like.

In general, a processor 102 can be any technically feasible processing device or hardware unit capable of processing data and executing software applications and program code. The processor 102 executes the software and performs the functions and operations set forth in the embodiments described herein. For example, a processor 102 can comprise a central processing unit (CPU), a graphics processing unit (GPU), a digital signal processor (DSP), an application-specific integrated circuit (ASIC), a field programmable gate array (FPGA) or other programmable logic device, discrete gate or transistor logic, discrete hardware components, or any combination of different processing units, such as a CPU configured to operate in conjunction with a GPU.

The memory unit 104 can include a hard disk, a random access memory (RAM) module, a flash memory unit, or any other type of memory unit or combination thereof. Processor 102 and I/O devices read data from and write data to memory 104. The memory unit 104 stores software application(s) and data. Instructions from the software constructs within the memory unit 104 are executed by processors 102 to enable the inventive operations and functions described herein.

I/O devices 103 are also coupled to memory 104 and can include devices capable of receiving input as well as devices capable of providing output. The I/O devices 103 can include input and output devices not specifically listed in the 2D hardware 150 and VR hardware 170, such as a network card for connecting with a network, a speaker, a fabrication device (such as a 3D printer), and so forth. Additionally, I/O devices can include devices capable of both receiving input and providing output, such as a touchscreen, a universal serial bus (USB) port, and so forth.

The computer system 101 is connected to various 2D hardware 150, including a 2D monitor 151, 2D mouse 152, and a keyboard 153. The 2D monitor 151 can comprise a conventional/traditional flat display that displays 2D images (such as 2D windows and user interfaces). The 2D mouse 152 can comprise a traditional 2-Degree of Freedom input device that operates in 2D along a flat/horizontal surface, such as a desk. Although some embodiments described herein relate to a 2D mouse 152, the disclosed techniques can also apply to other 2D input devices, such as a trackball.

The computer system 101 is also connected to various VR hardware 170, including a VR headset 171, a VR controller 172, and one or more tracking devices 173. The VR controller 172 comprises a VR-tracked device that is tracked by the tracking devices 173 that determine 3D position/location information for the VR controller 172. The VR controller 172 comprises a 6-Degree of Freedom (6DOF) controller that operates in 3D, which can be less precise and more tiring to operate than the 2D mouse 152 which operates in 2D. The VR headset 171 can display images in 3D stereo images (such as the VR scene 175). The VR headset 171 comprises a VR-tracked device that is tracked by the tracking devices 173 that can determine 3D position/location information for the VR headset 171. In some embodiments, the tracking devices 173 track a 3D position of a user viewpoint by tracking the 3D position of the VR headset 171. Although the below embodiments describe a VR interface, the disclosed techniques can also apply to an AR interface, as discussed below.

The memory unit 104 stores a VR engine 112, a monitoring notification engine 113, a user application 120, and a virtual environment 130. Although shown as separate software components, VR engine 112 and monitoring notification engine 113 can be integrated into a single software component. In further embodiments, the user application 120 and monitoring notification engine 113 can be stored and executed on the VR Headset 171.

The user application 120 can comprise, for example, a 3D design application for creating, modifying, and interacting with the virtual environment 130. In other embodiments, the user application 120 can comprise any other type of 3D-based application, such as a 3D video game, a 3D data analysis application, or the like. The virtual environment 130 can comprise a 3D virtual environment stored, for example, as data describing a current scene (such as the 3D position/location, orientation, and details of virtual objects), data describing a user viewpoint (3D position/location and orientation) in the virtual environment, data pertinent to the rendering of the virtual scene (such as materials, lighting, and virtual camera location), and the like.

The VR engine 112 renders a VR scene 175 comprising a 3D representation of the virtual environment 130. The VR scene 175 is displayed within the VR headset 171. The user can interact with the virtual environment 130 for performing productive work (such as workflows or tasks) in the user application 120 via the VR scene 175 and VR hardware 170. For example, the user can navigate within the virtual environment 130 or perform workflows or tasks within the virtual environment 130 using one or more VR controllers 172. Meanwhile, the VR scene 175 displayed on the VR headset 171 provides visual feedback to the user to assist in performing the workflows or tasks within the virtual environment 130.

The monitoring notification engine 113 generates and displays privacy-sensitive monitoring indicators. The monitoring indicators include indicators representing privacy-sensitive information. The privacy-sensitive information includes "internal" indicators, which are presented to a user of the VR headset 171, in which case the indicators represent the location and/or a passthrough view of a bystander located in the real-world environment in the proximity of the user (e.g., less than a threshold distance from the user). For example, the internal indicators can be displayed on a display of the VR headset 171 that is visible to the user while the user is wearing the VR headset 171. The display visible to the user is referred to herein as an "internal display." The privacy sensitive information also includes "external" indicators, which are presented to a bystander in the real-world environment using a 2D monitor 151 and/or Illumination hardware 160. The Illumination hardware 160 can include projection lights and/or a wearable vest equipped with LED lights. The user of the VR headset 171 can wear the vest. The amount and/or level of detail of information presented by the indicators can be determined based on a user privacy level. The user privacy level can be specified by the user of the VR headset 171 or determined based on information available in the computer system 101, such as a task the user is performing in the virtual environment 130. The external indicators are displayed or otherwise presented on an external display such as the 2D monitor 151. The external display is in a location in which information displayed on the external display, such as the external indicators, is visible to bystanders in the real-world environment, such as bystanders who are in the proximity of the user.

Although embodiments are described herein with respect to a VR environment and VR hardware and applications, the techniques described herein can be implemented with any type of extended-reality (ER) environment, such as augmented-reality (AR) environments and mixed-reality (MR) environments, using any suitable ER hardware. For example, in other embodiments, system 100 could include AR-specific hardware and software components. AR hardware could include, for example, an AR headset, one or more AR controllers, tracking devices for the one or more AR controllers, and the like. AR software could include an AR application or AR engine that renders an AR scene of a 3D virtual environment for display on the AR headset.

Figure 2:
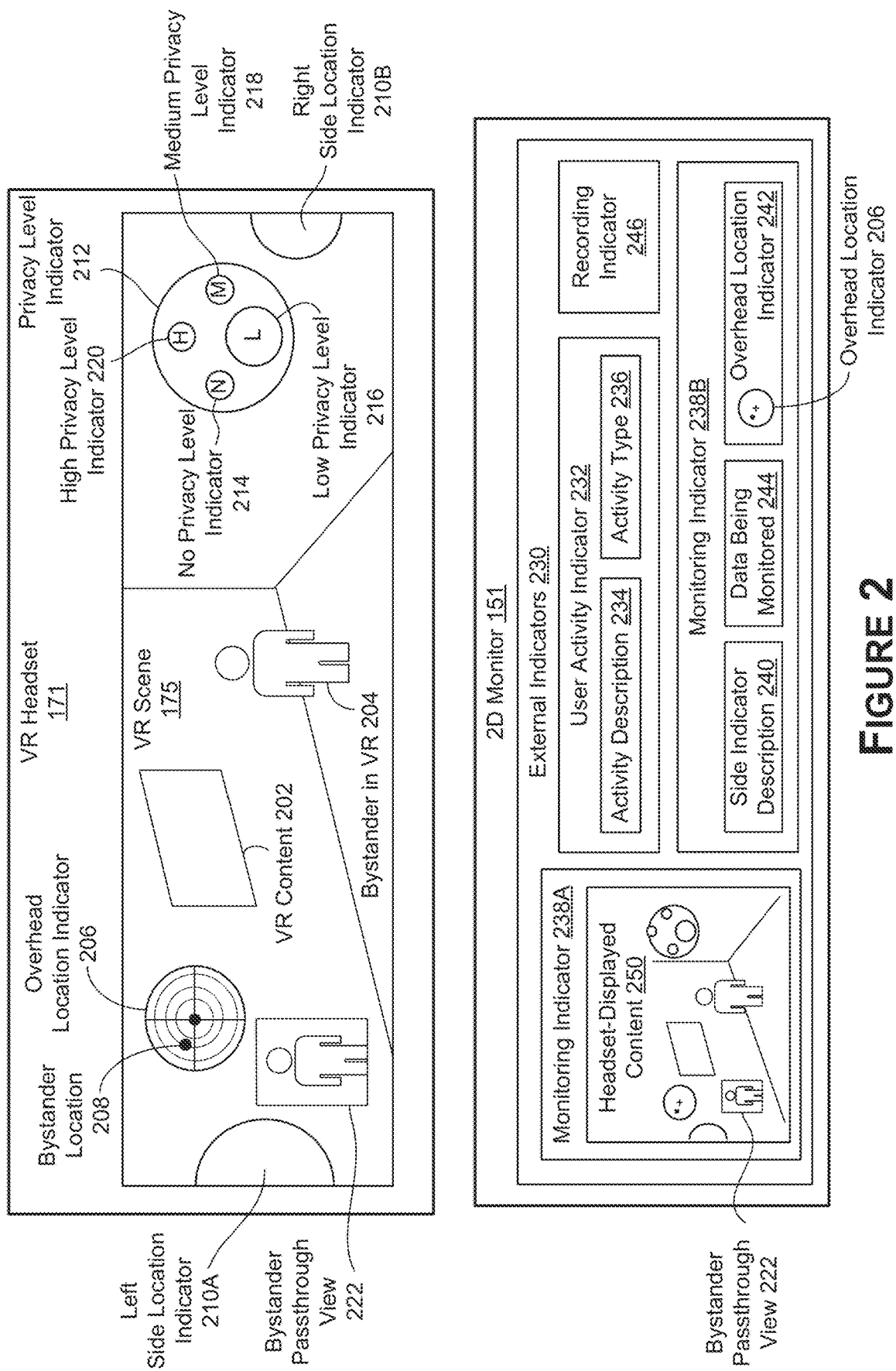
FIG. 2 illustrates internal privacy indicators presented in a headset and external privacy indicators presented on an external display, according to various embodiments.

FIG. 2 illustrates internal privacy indicators presented in a headset and external privacy indicators presented on an external display, according to various embodiments. A VR headset 171 presents a VR scene 175 on a display screen in VR headset 171. The VR scene 175 depicts VR content 202, such as a virtual room having a window. The VR scene 175 also depicts a bystander 204. The bystander 204 is depicted at a location in the VR scene 175 that is based on a location of the bystander in a real-world environment. The appearance of the bystander 204, e.g., height, hair color, and other visible attributes, are determined by the VR engine 112 based on the appearance of the bystander in the real world. Alternatively or additionally, the bystander 204 can be an image of the real world depicting the bystander as captured by a camera or as seen through a transparent portion of the VR headset 171.

As described above, a monitoring notification engine 113 generates and displays privacy-sensitive monitoring indicators that represent privacy-sensitive information. The privacy-sensitive information includes internal indicators, which are presented to a user of the VR headset 171. The internal privacy indicators presented to the user of the VR headset 171 include a location indicators 206, 210 that represent the location of a bystander in the real-world environment, and/or a bystander passthrough view 222 via which the user can see a bystander located in the real-world environment.

The amount and/or level of detail of information presented by the internal privacy indicators in the VR headset 171 can be determined based on a user privacy level. The user privacy level can be specified by the user of the VR headset 171 or determined based on information available in the computer system 101, such as a task the user is performing in the virtual environment 130. The light projected by the Illumination hardware 160 can vary in color based on the user privacy level, so that a bystander can be made aware of the user privacy level of a user of the VR headset 171.

The monitoring notification engine 113 causes a privacy level indicator 212 to be displayed in the VR scene 175 on a display of the VR headset 171. The privacy level indicator 212 and internal privacy indicators can be superimposed on the VR scene 175, for example. The privacy level indicator 212 includes four circular indicators, and each circular indicator corresponds to a privacy level. In this example, there are four privacy levels: "none", which indicates that no privacy indications are to be displayed, "low", which indicates that a relatively small amount of privacy information is to be displayed, "medium", which indicates that a medium amount of privacy information is to be displayed, and "high", which indicates that a relatively large amount of privacy information is to be displayed. The monitoring notification engine 113 increases the size of the circular indicator that corresponds to the user privacy level. For example, if the user privacy level is "none", the size of the no privacy level indicator 214 is increased. If the user privacy level is "low", the size of the low privacy level indicator 216 is increased. If the user privacy level is "medium", the size of the medium privacy level indicator 218 is increased. If the user privacy level is "high", the size of the high privacy level indicator 220 is increased. Each circular indicator can be displayed in a respective color that corresponds to the privacy level of the indicator. For example, the no privacy level indicator 214 can be displayed in green, the low privacy level indicator 216 can be displayed in yellow, the medium privacy level indicator 218 can be displayed in orange, and the high privacy level indicator 220 can be displayed in red. Although particular privacy levels are described in the examples herein, any suitable privacy levels can be used in other examples. Further, although particular colors are described as being associated with privacy levels in the examples herein, any suitable representation of privacy levels can be used in other examples, such as different colors than those described herein, for example.

The monitoring notification engine 113 can cause a side location indicator 210 to be displayed in the VR scene 175. The side location indicator 210 represents presence of, direction to, and/or distance to a detected location of a bystander who is not visible in the VR scene 175 displayed in the VR headset 171. The monitoring notification engine 113 tracks a distance and position of each detected bystander. The location of the side location indicator 210 on the internal display indicates a direction to the bystander relative to the user. The direction can be to the left or right of the user. For example, a location of the side location indicator 210 on the left half of the VR scene 175 indicates that the bystander is located to the left of the user. Further, a location of the side location indicator 210 on the right half of the VR scene 175 indicates that the bystander is located to the right of the user. As another example, the side location indicator 210 can be displayed on the left or right side of the VR scene 175 to indicate whether a bystander is located to the left of the field of view of the user or to the right of the field of view of the user in the real world. The side location indicator 210 can be a portion of a circle, such as a semicircle, a sphere or a portion of a sphere, or other shape displayed on the left or right edge of the VR headset 171. For example, a portion of the semicircle, such as an edge, can be located adjacent to the left edge of the VR scene if the bystander is located to the left of the user. The size of the side location indicator 210 is based on and represents the distance between the user and the bystander. The size of a side location indicator 210 can vary in proportion or inverse proportion to the distance between the user and the bystander. The size of the side location indicator 210 can vary from a small shape for farther distances from the user to a large circle for closer distances to the user. For example, the distance can be close, medium, or far, in which cases the size of the location indicator 210 can be small, medium, or large, respectively. A left side location indicator 210A indicates that a bystander is to the left of the field of view of the user. A right side location indicator 210B indicates that another bystander is to the right of the field of view of the user. The right side location indicator 210B is smaller than the left side location indicator 210A, thereby indicating that the bystander to the left is farther from the user than the bystander to the right. A side location indicator 210 can be displayed if the privacy level is low, for example. The side location indicator 210 can be displayed for other privacy levels in other examples. For example, the user can specify that the side location indicator 210 is to be displayed in specific privacy levels, or in all privacy levels.

The monitoring notification engine 113 can cause an overhead location indicator 206 to be displayed to indicate the location of a bystander in an overhead view. The overhead view resembles a radar screen that shows a direction and distance of the bystander from the user. The overhead location indicator 206 includes a bystander location 208 that represents the location of the bystander relative to the location of the user. The overhead location indicator 206 can be displayed if the privacy level is medium, for example. As with other privacy indicators described herein, the overhead location indicator 206 can be displayed for other privacy levels in other examples. For example, the user can specify that the overhead location indicator 206 is to be displayed in specific privacy levels, or in all privacy levels.

The monitoring notification engine 113 can cause a bystander passthrough view 222 to be displayed to indicate the location of the bystander in the VR scene 175 based on the location of the user in the real-world environment. For example, if the bystander is at a location in the real-world environment that would be on the left side of the field of view of the user (if the user could see the real-world environment), then the bystander passthrough view 222 is displayed on the left side of the VR scene 175 at a location in the VR scene 175 that corresponds to the location of the bystander in the real-world environment. The overhead location indicator 206 can be displayed if the privacy level is high, for example. As with other privacy indicators described herein, the bystander passthrough view 222 can be displayed for other privacy levels in other examples.

The monitoring notification engine 113 can cause one or more external indicators 230 to be displayed on a 2D monitor 151. Bystanders in the real-world environment can see the external indicators 230 and thus be made aware of privacy-related actions being performed by the VR headset 171. The external indicators 230 include headset-displayed content 250, which includes at least a portion of the content being displayed by the VR headset 171. In this example, the headset-displayed content 250 displays the VR scene 175, including the bystander passthrough view 222 from the VR scene 175. The headset-displayed content 250 can be displayed on the 2D monitor 151 when the user privacy level is none (e.g., no privacy), for example.

The external indicators 230 include a user activity indicator 232, which can include an activity description 234 and/or an activity type 236. The activity description 234 can include descriptive details of an activity in which the user is engaged, such as viewing streaming content or participating in a meeting. As an example, if the user is using an application, the activity description 234 displays the name of the application. As another example, if the user is participating in a meeting, the activity description 234 displays a description of the meeting, and the description includes the name, start time, and end time of the meeting. The activity description 234 can be displayed if the user privacy level is low, for example. The activity type 236 is a less-detailed representation of the activity in which the user is engaged than the activity description 234. The activity type 236 includes a description of the type of the activity. For example, for the meeting example, the activity type 236 displays the text "meeting" with no other details. The activity type 236 can be displayed if the user privacy level is medium for example. As another example, the user activity indicator 232 can display an indication that no activity information is available (e.g., "Privacy Please") if the user privacy level is high.

The external indicators 230 include a recording indicator 246, which indicates whether the headset is recording data that is potentially related to the bystander, such as presence, distance, activity, or other data. Data that is being recorded can be stored in persistent storage for a relatively long amount of time, or can be stored in memory for a relatively short amount of time. The recording indicator can be displayed as text such as "REC" and/or an icon such as a circle or square in a color such as red to indicate that data is being recorded. If data is not being recorded, then the recording indicator is not displayed, or is displayed as text such as "Not Recording" and/or a suitable icon. The recording indicator 246 can be displayed if the privacy level is low, medium, or high, for example.

The external indicators 230 include monitoring indicators 238, which display information about monitoring of the bystander or the real-world environment by the VR headset 171. The external monitoring indicators 238 displayed on the 2D monitor 151 include an external monitoring indicator 238A, which displays a copy or other rendering of headset-displayed content 250. The headset-displayed content 250 can be a reproduction (e.g., streamed video capture) of the content being displayed on the headset 171, for example. The monitoring indicators 238 also include an external monitoring indicator 238B, which displays a side indicator description 240, a monitoring activity indicator 244, and/or an overhead location indicator 242. The side indicator description 240 displays a text description of a side location indicator 210 that is being displayed in the VR scene 175. For example, if the side location indicator 210 has a small size and is on the left side of the headset display, then the side indicator description 240 displays: "Detected: Close Left." As another example, if no bystanders are detected by the headset, then the side indicator description 240 displays "No Bystanders Detected" or other suitable description.

The overhead location indicator 242 displays the overhead location indicator 206 being displayed in the VR scene 175. The monitoring activity indicator 244 displays a description of the type of data being monitored and/or recorded by the VR headset 171. The type of data being monitored and/or recorded can include presence data, in which case the data being monitored and/or recorded indicator 244 includes text such as "Presence". The type of data being monitored and/or recorded can include distance data, in which case the monitoring activity indicator 244 includes text such as "Distance".

The presence data being monitored and/or recorded can be displayed in the headset as location of the left or right side location indicator 210, for example. The location of the left or right side location indicator 210 in the headset display (e.g., at the left side or right side) indicates whether the bystander is to the left or right of the user. The side location indicator 210 can be the left side location indicator 210A on the left side of the headset display indicating that the bystander is located to the left of the user, or the right side location indicator 210B on the right side of the headset display indicating that the bystander is to the right of the user. The distance data being monitored and/or recorded can be displayed as the size of the left or right side location indicator 210 in the headset display (e.g., small, medium, or large) indicates the distance of the bystander from the user.

The monitoring indicator 238 can display a reproduction of the content being displayed on the display of a VR headset 171. The monitoring indicator can display the reproduction of the content if, for example, the VR headset 171 is displaying the bystander passthrough view 222. In some embodiments, the monitoring indicator 238 can be displayed regardless of the user privacy level, since the information about monitoring of the bystander being displayed is not considered private to the user. The locations/positions of the indicators shown in FIG. 2 are examples, and the indicators can be displayed at any suitable locations/positions in the VR scene 175 in other examples.

Figure 3A:
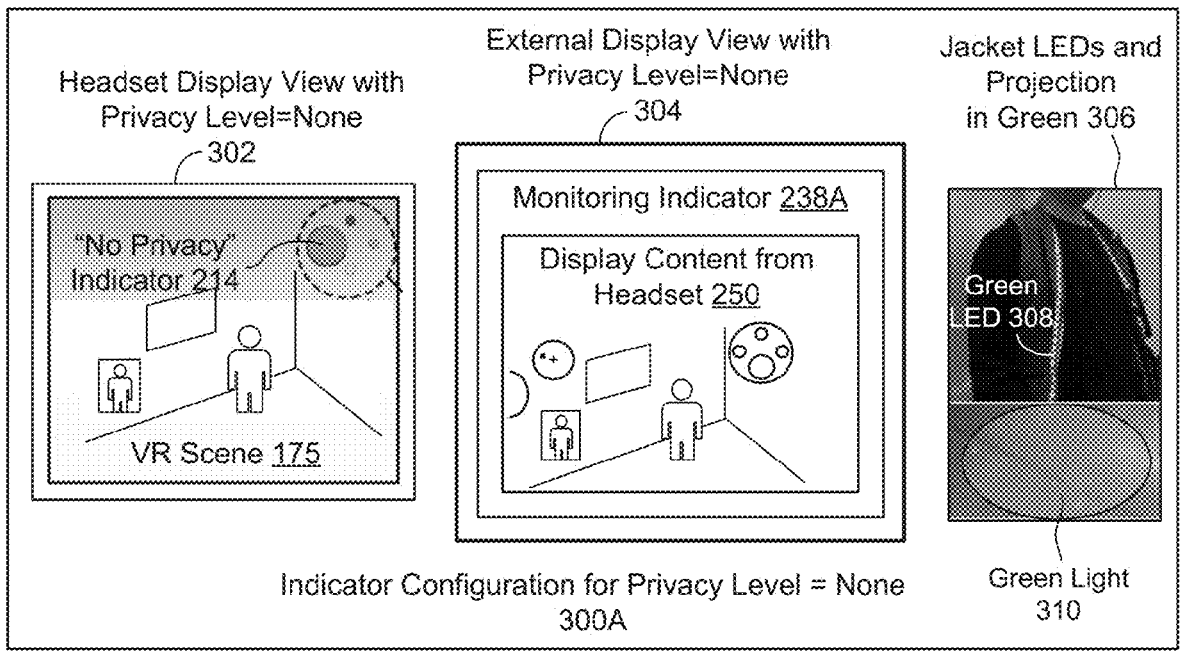
FIGS. 3A and 3B illustrate internal and external privacy indicators presented for different privacy levels, according to various embodiments.
Figure 3A:
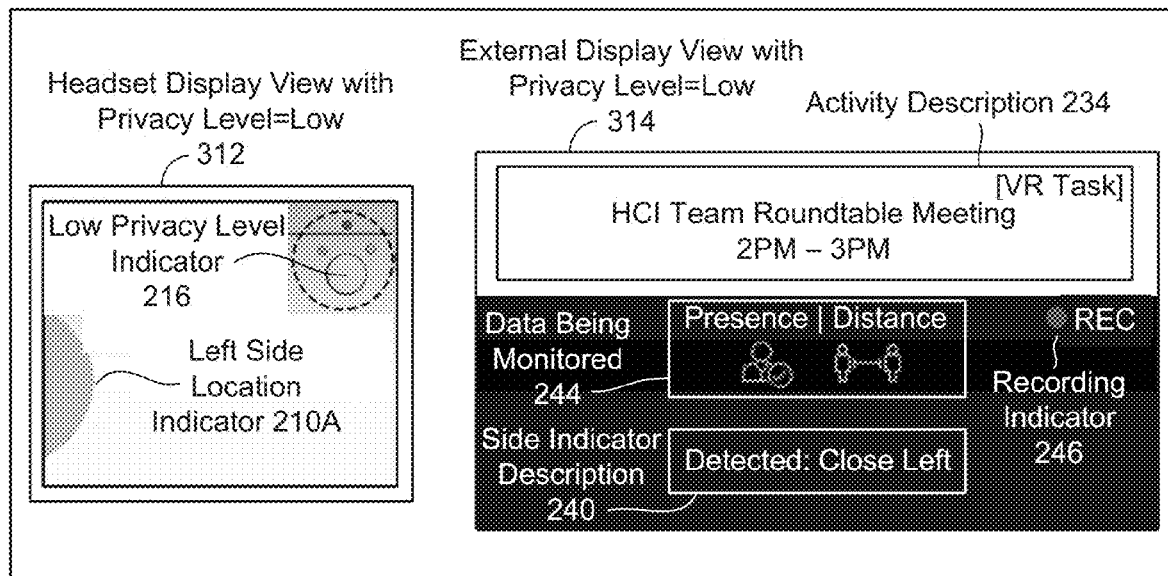
Figure 3A:
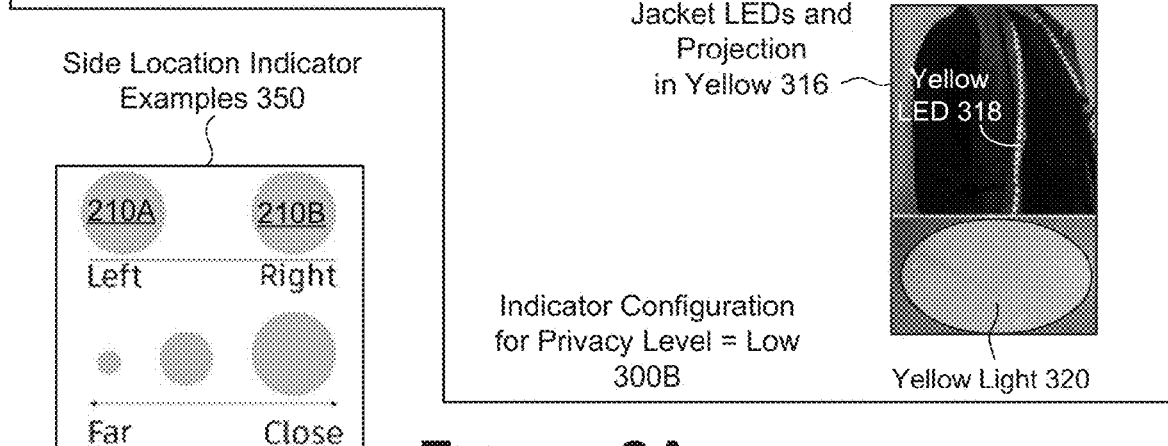

FIG. 3A illustrates internal and external privacy indicators presented for privacy levels of "none" and "low", according to various embodiments. The internal and external privacy indicators illustrated in FIG. 3A include indicators presented for the privacy level "none" according to an indicator configuration 300A and indicators presented for the privacy level "low" according to an indicator configuration 300B. According to an indicator configuration for privacy level="none" 300A, a headset display view 302, which is displayed on VR headset 171, includes a no privacy level indicator 214 having the color green, which indicates that the privacy level is "none". Thus, no privacy indicators 206, 210, 224 are displayed in the headset display view 302. An external display view 304, which is displayed on an external display such as 2D monitor 151 when the user privacy level is "none", displays an image being displayed on a display of VR headset 171 because the user privacy is set to "none" (indicating that the user does not want privacy restrictions to be applied to the display from VR headset 171). A jacket LEDs and projection example 306 shows that the Illumination hardware 160 produces green light 308 on a jacket and projects green light 310 when the privacy level is "none".

According to an indicator configuration for privacy level="low" 300B, a headset display view 312 is displayed on VR headset 171 when the privacy level is "low" and includes a left side location indicator 210A and a low privacy level indicator 216 having the color yellow. The color yellow indicates that the privacy level is low. An external display view 314, which is displayed on 2D monitor 151, depicts an activity description 234 of a meeting when the privacy level is low. The activity description 234 includes the name of a meeting invite and the time and/or duration of the meeting. In this example, the activity description 234 is "HCI Team Roundtable Meeting 2 PM-3 PM." The external display view 314 depicts a monitoring activity indicator 244 and a side indicator description 240. The monitoring activity indicator 244 contains the text "Presence|Distance", which indicates that the presence of and distance to bystanders are being monitored and/or recorded by the headset 171. The side indicator description 240, which describes the side indicator displayed in the headset 171, contains the text "Detected: Close Left", which indicates that the headset has detected a bystander located close to and to the left of the headset 171. The external display view 314 also shows a red recording indicator 246 with the text "REC" to indicate that the camera of the headset 171 is recording the real-world environment. Further, a jacket LEDs and projection example 316 illustrates that the Illumination hardware 160 produces yellow light 318 on a jacket and projects yellow light 320 when the user privacy level is low. Side location indicator examples 350 illustrate a left side location indicator 210A and a right side location indicator 210B. Side location indicator examples 350 also illustrate that the size of the side location indicator 210 can vary from a small circle for far distances to the bystander to a large circle for close distances to the bystander. Although particular indicators are shown in each indicator configuration 300A, 300B, other indicators can be presented in the privacy levels "none" and/or "low" in other examples.

A user can specify different indicators to be displayed for each privacy level, in which case the indicators specified by the user form a user indicator configuration, which associates one or more of the privacy levels with internal and/or external indicators specify by the user. The user can specify a user indicator configuration that matches their working contexts, such as the work they conduct, the physical space they are in, the people they share the space with, and their subjective privacy perceptions. The monitoring notification system determines which indicators to display in each privacy level based on a user indicator configuration specified for the privacy level if the user has specified an indicator configuration for the privacy level. If the user has not specified a user indicator configuration for a privacy level, then the monitoring notification system determines which indicators to display for the privacy level according to a default configuration, such as the configurations shown in FIGS. 3A and 3B. Thus, the user indicator configuration can specify one or more internal indicators, such as the overhead location indicator 206, the side location indicator 210, or the bystander passthrough view 222, for each of the privacy levels. Further, the user indicator configuration can specify one or more external indicators 230, such as the user activity indicators 232 (e.g., activity description 234 and/or activity type 236), monitoring indicator 238A (e.g., headset-displayed content 250), monitoring indicator 238B (e.g., side indicator description 240, data being monitored 244, and/or overhead location indicator 242), and/or recording indicator 246 for each of the privacy levels. As an example, the user can specify an indicator configuration that associates the low, medium, and high privacy levels with the side location indicator 210, in which case the side location indicator 210 is displayed in the headset display view 312 on VR headset 171 when the privacy level is any of low, medium, or high. As another example, the user can specify an indicator configuration that associates the medium and high configuration levels with the side location indicator 210 and the overhead location indicator 206 and the bystander passthrough view 222, in which case the overhead location indicator 206 and the bystander passthrough view 222 are both displayed in the headset display view 312 on VR headset 171 when the privacy level is medium or high.

Figure 3B:
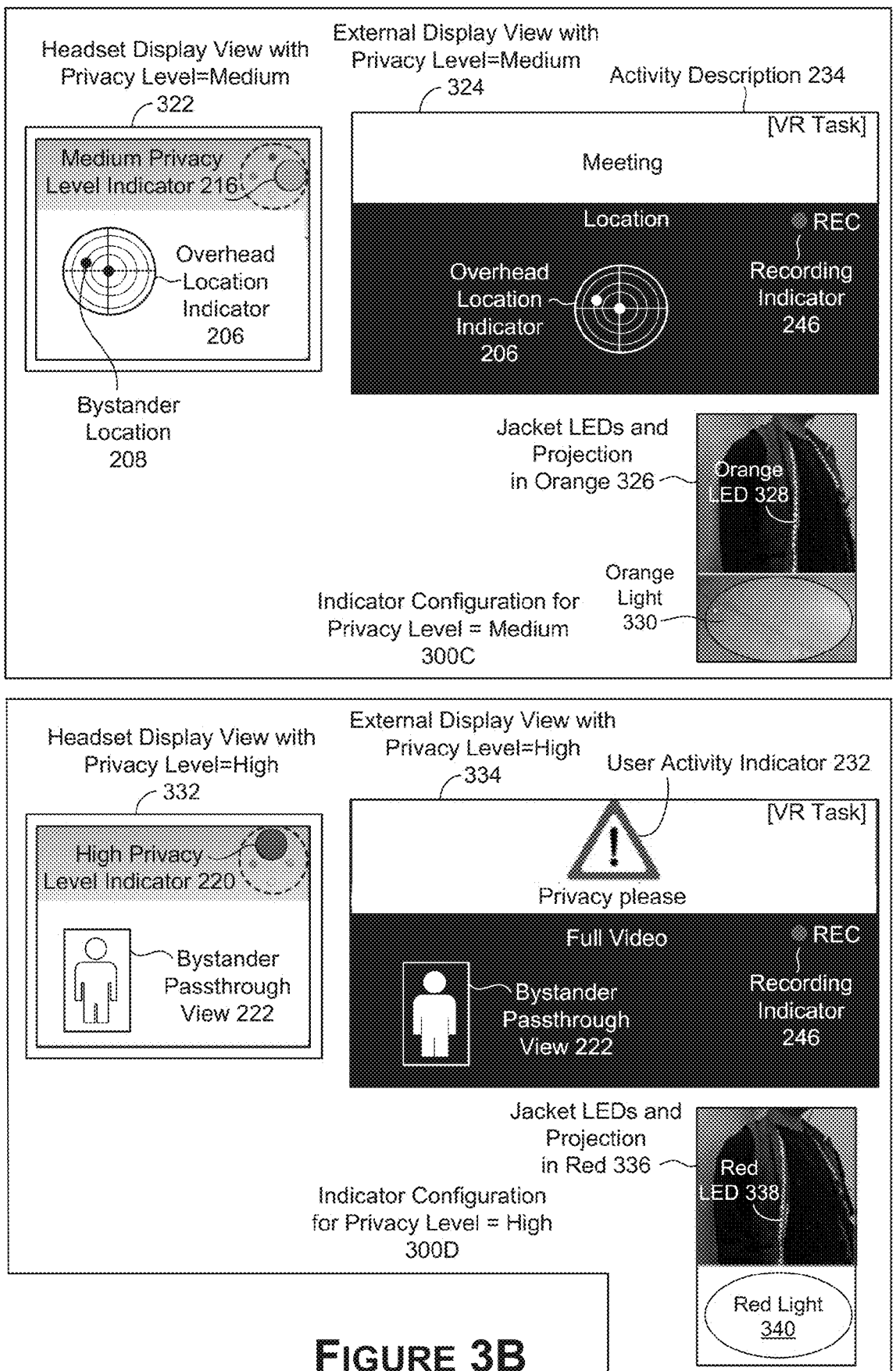

FIG. 3B illustrates internal and external privacy indicators presented for privacy levels of "medium" and "high", according to various embodiments. The internal and external privacy indicators illustrated in FIG. 3B include indicators presented for the privacy level "medium" according to an indicator configuration 300C and indicators presented for the privacy level "high" according to an indicator configuration 300D. According to an indicator configuration for privacy level="medium" 300C, a headset display view 322 is displayed on VR headset 171 when the privacy level is medium and includes a medium privacy level indicator 218 having the color orange. The color orange indicates that the privacy level is medium. The headset display view 322 also includes an overhead location indicator 206, which indicates the bystander location 208 as a dot relative to a location of the headset. The location of the headset is represented by a dot at the center of the overhead location indicator 206. An external display view 324, which is displayed on 2D monitor 151, is displayed when the privacy level is medium. The external display view 324 illustrates that the external display, such as 2D monitor 151, displays an activity type 236 ("Meeting"), and also displays a depiction of the overhead location indicator 206 that is displayed in the VR headset 171. Further, a jacket LEDs and projection example 326 illustrates that the Illumination hardware 160 produces orange light 328 on a jacket and projects orange light 330 when the privacy level is medium.

According to an indicator configuration for privacy level="high" 300D, a headset display view 332 is displayed on VR headset 171 when the privacy level is high and includes a high privacy level indicator 220 having the color red. The color red indicates that the privacy level is high. The headset display view 332 also includes a bystander passthrough view 222, which depicts an image of the bystander in the real-world environment. An external display view 334, which is displayed on 2D monitor 151 when the privacy level is high, displays a user activity indicator 232 that indicates "Privacy please." The user activity indicator 232 thus does not display information about activity of the user when the privacy level of the user is high. A depiction of the bystander passthrough view 222 is displayed in the VR headset 171 when the privacy level of the user is high. The depiction and location of the bystander are known to the bystander and are not subject to a user privacy level restriction in this example. Further, a jacket LEDs and projection example 336 illustrates that the Illumination hardware 160 produces red light 338 on a jacket and projects red light 340 when the privacy level is high. Although particular indicators are shown in each indicator configuration 300C, 300D, other indicators can be presented in the privacy levels "medium" and/or "high" in other examples. For example, a user can specify different indicators to be displayed in each privacy level, in which case the indicators specified by the user form a user indicator configuration, which is used to determine which indicators to display in each privacy level for which the user has specified an indicator configuration.

Figure 4:
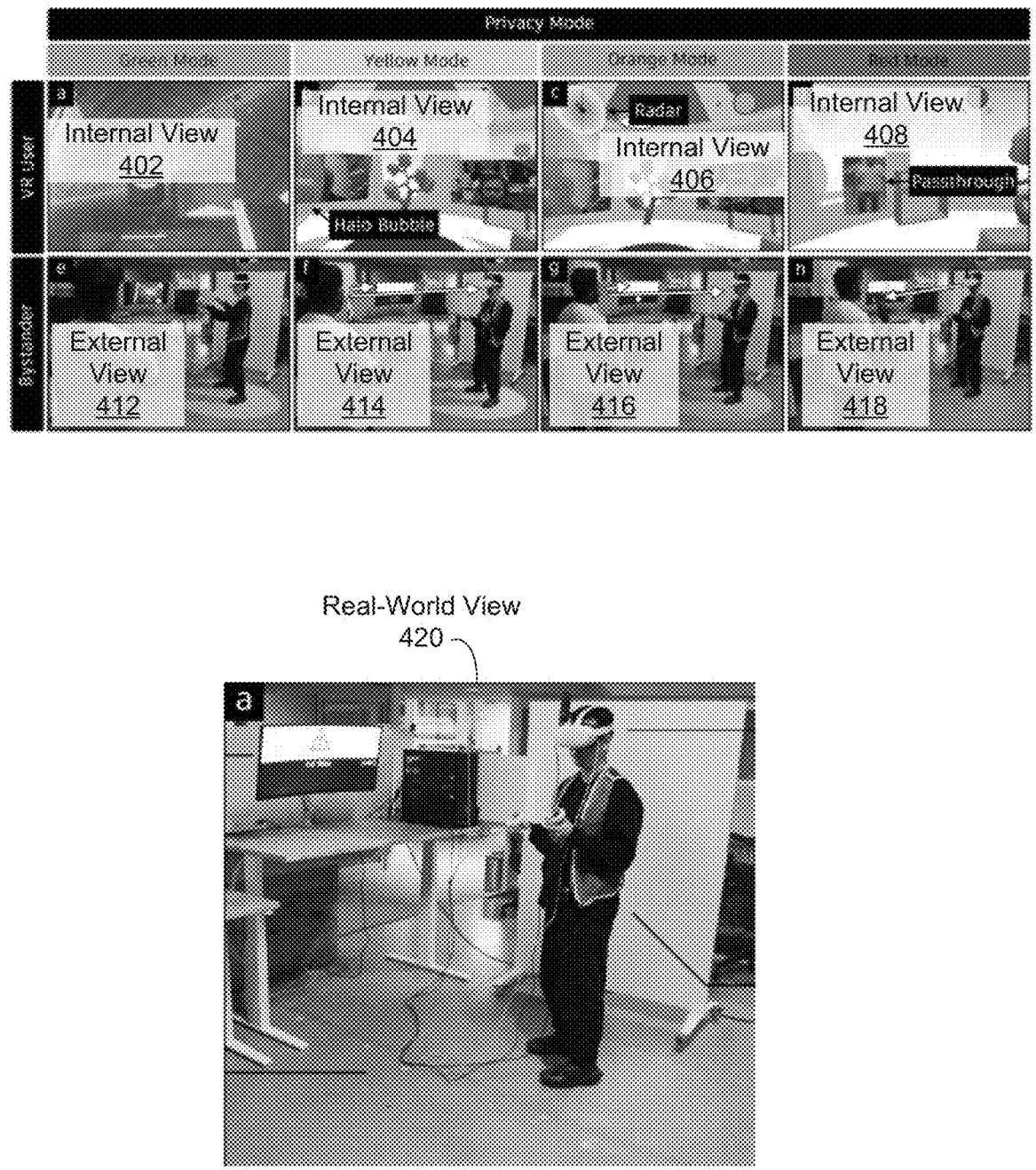
FIG. 4 illustrates headset display views showing internal privacy indicators and real-world views showing external privacy indicators presented for different privacy levels, according to various embodiments.

FIG. 4 illustrates headset display views showing internal privacy indicators and real-world views showing external privacy indicators presented for different privacy levels, according to various embodiments. An internal view 402 depicts a steaming VR task when the privacy level is none. The streaming VR task can be displayed because the headset-displayed content 250 (e.g., the content being displayed on the VR headset 171) is not restricted when the user privacy level is none. An external view 412 shows that the illumination hardware 160 produces green illumination when the privacy level is none, and also shows the real-world environment, which contains a bystander to the left of the user of the VR headset 171. The light produced by the illumination hardware 160 is visible to the bystander, who is in the proximity of the user of the VR headset 171.

An internal view 404 depicts a VR scene 175 generated by a user application 120 when the privacy level is low. A left side location indicator 210A is shown in internal view 404 because the bystander is to the left of the field of view of the user. The left side location indicator 210A is relatively small, thereby indicating that the bystander is relatively far away from the left side of the user. An external view 414 shows the bystander when the privacy level is low, and also shows that the Illumination hardware 160 produces yellow illumination when the privacy level is low.

An internal view 406 depicts a VR scene 175 generated by a user application 120 when the privacy level is medium. A relatively large left side location indicator 210A is displayed to indicate that the bystander is relatively close to the left side of the user. An overhead location indicator 206 is also shown in the internal view 406, and indicates that the bystander is to the front left of the user at a relatively close distance. An external view 416 shows the bystander when the privacy level is medium, and also shows that the illumination hardware 160 produces orange illumination when the privacy level is medium.

An internal view 408 depicts a VR scene 175 generated by a user application 120 when the privacy level is high. The left side location indicator 210A is smaller than that shown in internal view 406 because the bystander has moved farther away at the time internal view 408 is displayed. The left side location indicator 210A is shown in the internal view 408 because the user has configured the monitoring notification engine 113 to display the side location indicator 210 in low, medium, and high privacy levels. The internal view 408 also includes a bystander passthrough view 222, which depicts the bystander as seen by a camera mounted on the VR headset 171. The overhead location indicator 206 that was shown in the internal view 406 is not shown in the internal view 408 because the privacy level has changed to high. An external view 418 shows the bystander when the privacy level is high. The external view 418 also shows that the Illumination hardware 160 produces red illumination when the privacy level is high.

A real-world view 420 shows a user in the real-world environment wearing the VR headset 171 and vest that has LED lights. The lights illuminate with the color that corresponds to the user privacy level. A 2D monitor 151 in real-world view 420 is displaying a user activity indicator 232 that indicates "Privacy please" because the user privacy level is high, as shown by red illumination projected onto the floor by the Illumination hardware 160, and red illumination produced by LED lights on the vest worn by the user.

Figure 5:
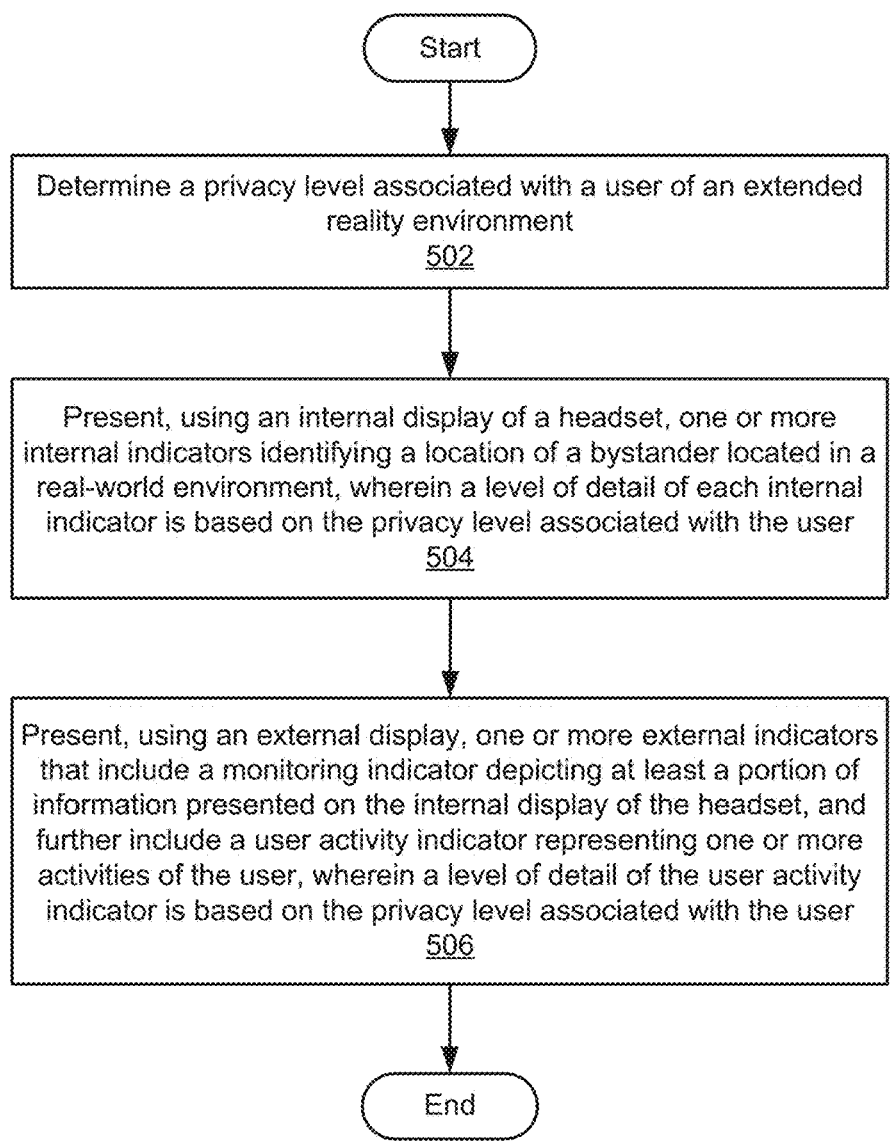
FIG. 5 is a flow diagram of method steps for presenting privacy indicators based on a user privacy level, according to various embodiments.

FIG. 5 is a flow diagram of method steps for presenting privacy indicators based on a user privacy level, according to various embodiments. Although the method steps are described in conjunction with the systems of FIGS. 1-4, persons skilled in the art will understand that any system configured to perform the method steps in any order falls within the scope of the present disclosure.

As shown, in step 502, computer system 101 determines a privacy level associated with a user of an extended reality environment. The privacy level can be determined based on user input or based on a task being performed by the user in the extended reality environment, for example. The privacy level can be low, medium, or high. The privacy level can also be "none" to indicate that no privacy restrictions are to be applied to information presented to bystanders about the user. The computer system 101 can also display, using the internal display of the headset, a privacy level indicator 212 that is based on the privacy level associated with the user and informs the user of the privacy level. The privacy level can also be displayed in the real-world environment using an Illumination hardware 160, such as a light emitting diode or other light emitting device that emits light having a color that corresponds to the privacy level.

In step 504, computer system 101 presents, using an internal display of a headset, one or more internal indicators identifying a location of a bystander located in a real-world environment, wherein a level of detail of each internal indicator is based on the privacy level associated with the user. The internal indicators can be determined based on the privacy level. In various embodiments, the internal indicators can be determined based on the privacy level using a user-specified indicator configuration that associates the privacy level with the one or more internal indicators. Computer system 101 can determine whether the user has provided an indicator configuration that associates the privacy level with one or more internal indicators. If so, computer system 101 can use the internal indicators associated with the privacy level by the indicator configuration as the one or more internal indicators identifying the location of the bystander. That is, in step 504, computer system 101 can present the one or more internal indicators associated with the privacy level by the indicator configuration. Although the indicator configuration is described as being specified by the user in examples described here, the indicator configuration can be specified in any suitable manner. For example, the indicator configuration can be included with the monitoring notification system in addition or as an alternative to being specified by the user.

The internal indicators can include a side location indicator. The side location indicator can be included if the user privacy level is low, for example. A location/position of the side location indicator on the internal display indicates whether the bystander is to the left or right of the user.

The internal indicators can also include an overhead location indicator displaying a location of the bystander relative to the user in a two-dimensional overhead view. The overhead location indicator can be included if the user privacy level is medium, for example. The internal indicators can further include a view of the bystander in the real-world environment, and wherein the view is displayed at a location of the bystander in a field of view of the user. The view of the bystander in the real world can be included if the user privacy level is high, for example.

In step 506, computer system 101 presents, using an external display, one or more external indicators that include a monitoring indicator 238 depicting at least a portion of information presented on the internal display of the headset, and further include a user activity indicator 232 representing one or more activities of the user, wherein a level of detail of the user activity indicator is based on the privacy level associated with the user. The monitoring indicator can include a representation of the one or internal indicators that are being presented to the user. The user activity indicator 232 can include a description of an activity in which the user is engaged, such as an activity description 234 or an activity type 236. The external indicators can be determined based on the privacy level. In various embodiments, the external indicators can be determined based on the privacy level using a user-specified indicator configuration that associates the privacy level with the one or more internal indicators. For example, in step 506, computer system 101 can present one or more external indicators associated with the privacy level by the indicator configuration.

In sum, a privacy-sensitive monitoring notification system presents privacy information indicators to inform immersive computing environment users and external bystanders of activities by others that affect the privacy of the immersive computing environment users and external bystanders. In the case of presenting privacy indicators to immersive computing environment users ("users"), the others are the external bystanders, and the privacy-affecting activities by the others include presence and movement of the external bystanders in physical proximity of the users. The indicators presented to the users are presented in the immersive computing environment and are referred to herein as 'internal indicators." The internal indicators can include indicators of the presence and movement of bystanders. The internal indicators presented to the users can be representations of the locations of the bystanders, and can be displayed in an immersive computing headset being worn by the user. A privacy level associated with the user indicates (a) an amount of information and/or level of detail to be included in internal indicators of the presence and movement of bystanders that are to be presented to the user in the headset. The privacy level can be selected from a range of levels, such as none, low, medium, or high. As the privacy level increases, the user is presented with more information and/or more details about the presence and movement of bystanders. For example, at the privacy level "none", no information about the presence and movement of bystanders is presented to the user in the headset. At the privacy level "high", detailed information about the presence and movement of bystanders is presented, e.g., by displaying a live video of each bystander in the headset at a location that corresponds to the location of the bystander in the real-world environment.

In the case of presenting indicators to bystanders, the others are the users, and the privacy-affecting activities by the users include monitoring of the real-world environment by the headset in the physical proximity of the bystanders and also include activities being performed by the users in the immersive computing environment. The indicators presented to the bystanders are referred to herein as "external indicators" and can be representations of the monitoring of the real-world environment as displayed in the immersive computing headset and/or representations of activities being performed by the users in the immersive computing environment, but are displayed using an external display or projection device and are visible in the real-world environment outside of the immersive computing environment.

The privacy level of the user also indicates (b) an amount of privacy to be provided to the user by the activity awareness system. The presentation of the monitoring of the real-world environment performed by the headset to bystanders is not affected by the privacy level, since the images or videos of the real-world environment being presented to the user are not considered private information of the user. The privacy level does indicate an amount of privacy to be provided to the user when presenting external indicators about activities of the user to bystanders. The amount of information and/or level of detail in the external indicators presented to bystanders about the privacy-affecting activities of the user is determined based on the privacy level of the user. For example, the amount of information and/or level of detail for activities of the user can be proportional to the privacy level.

At the privacy level "none", for example, there is no reduction in amount or detail of information presented to bystanders. If the user is engaged in a streaming VR task, the streaming VR task being presented to the user is also presented to the bystander. At the privacy level "low", for example, there is a relatively small reduction in amount or detail of information presented to bystanders. If the user is in a meeting, for example, the name and time of the meeting are presented to the bystander. At the privacy level "high", for example, there is a substantial reduction in amount or detail of information presented to bystanders. In the meeting example, the name of the meeting is presented to the bystander if the privacy level is "medium". No information about the activity of the user is presented to the bystander if the privacy level is "high".

One technical advantage of the disclosed techniques relative to the prior art is that users of the immersive virtual environment are informed by information displayed in their headset of the presence and location of bystanders who are present in the real-world environment. The user is thus made aware that their speech, for example, is not necessarily private. Further, the user can control the amount or level of detail of information presented in the headset by specifying a privacy level, so that users who are more concerned with privacy at a particular time can increase the amount of information presented about the presence of bystanders, for example.

Another technical advantage of the disclosed techniques relative to the prior art is that bystanders in the proximity of a user wearing a headset are informed by information displayed on a display device when they are being monitored by the headset. The information displayed on the display device can be the same information displayed to the user in the headset. Bystanders are thus made aware that their actions and speech are not necessarily private. Information about activities being performed by the user, which can be relevant to the privacy of bystanders, can also be presented on the display device to inform bystanders of how the images or video captured by the headset are being used in the immersive virtual environment. These technical advantages provide one or more technological improvements over prior art approaches.

1. In some embodiments, a computer-implemented method for providing awareness of privacy-related activities comprises determining a privacy level associated with a user of an extended reality environment; presenting, using an internal display of a headset, one or more internal indicators identifying a location of a bystander located in a real-world environment, wherein a level of detail of each internal indicator is based on the privacy level associated with the user; and presenting, using an external display, one or more external indicators that include a monitoring indicator depicting at least a portion of information presented on the internal display of the headset.

2. The computer-implemented method of clause 1, further comprising displaying, using the internal display of the headset, a privacy level indicator that is based on the privacy level associated with the user.

3. The computer-implemented method of clauses 1 or 2, further comprising displaying the privacy level indicator in the real-world environment using a light emitting diode (LED), wherein the privacy level indicator has a color that corresponds to the privacy level.

4. The computer-implemented method of any of clauses 1-3, wherein the privacy level is determined based on user input.

5. The computer-implemented method of any of clauses 1-4, wherein the privacy level is determined based on a task being performed by the user in the extended reality environment.

6. The computer-implemented method of any of clauses 1-5, wherein the one or more internal indicators are determined based on the privacy level.

7. The computer-implemented method of any of clauses 1-6, wherein the one or more internal indicators are determined based on the privacy level using a user-specified indicator configuration that associates the privacy level with the one or more internal indicators.

8. The computer-implemented method of any of clauses 1-7, wherein the one or more internal indicators comprise a side location indicator, wherein a location of the side location indicator on the internal display indicates a location of the bystander relative to the user.

9. The computer-implemented method of any of clauses 1-8, wherein the side location indicator is displayed in response to determining that the privacy level associated with the user is a low privacy level.

10. The computer-implemented method of any of clauses 1-9, wherein the one or more internal indicators comprise an overhead location indicator displaying a location of the bystander relative to the user in a two-dimensional overhead view.

11. The computer-implemented method of any of clauses 1-10, wherein the overhead location indicator is displayed in response to determining that the privacy level associated with the user is a medium privacy level.

12. The computer-implemented method of any of clauses 1-11, wherein the one or more internal indicators comprise a view of the bystander in the real-world environment, and wherein the view is displayed at a location on the internal display, wherein the location on the internal display corresponds to a location of the bystander in a field of view of the user.

13. The computer-implemented method of any of clauses 1-12, wherein the view of the bystander is displayed in response to determining that the privacy level associated with the user is a high privacy level.

14. The computer-implemented method of any of clauses 1-13, wherein the monitoring indicator includes a representation of the one or internal indicators that are being presented to the user.

15. The computer-implemented method of any of clauses 1-14, wherein the one or more external indicators further include a user activity indicator representing one or more activities of the user, wherein a level of detail of the user activity indicator is based on the privacy level associated with the user.

16. The computer-implemented method of any of clauses 1-15, wherein the user activity indicator includes a description of an activity in which the user is engaged.

17. The computer-implemented method of any of clauses 1-16, wherein the description of the activity in which the user is engaged is displayed in response to determining that the privacy level associated with the user is a low privacy level.

18. The computer-implemented method of any of clauses 1-17, wherein the user activity indicator includes a type of an activity in which the user is engaged, and the type of the activity is displayed in response to determining that the privacy level associated with the user is a medium privacy level.

19. In some embodiments, one or more non-transitory computer-readable media store instructions that, when executed by one or more processors, cause the one or more processors to perform the steps of: determining a privacy level associated with a user of an extended reality environment; presenting, using an internal display of a headset, one or more internal indicators identifying a location of a bystander located in a real-world environment, wherein a level of detail of each internal indicator is based on the privacy level associated with the user; and presenting, using an external display, one or more external indicators that include a monitoring indicator depicting at least a portion of information presented on the internal display of the headset.

20. In some embodiments, a system comprises: one or more memories that store instructions, and one or more processors that are coupled to the one or more memories and, when executing the instructions, are configured to perform the steps of: determining a privacy level associated with a user of an extended reality environment; presenting, using an internal display of a headset, one or more internal indicators identifying a location of a bystander located in a real-world environment, wherein a level of detail of each internal indicator is based on the privacy level associated with the user; and presenting, using an external display, one or more external indicators that include a monitoring indicator depicting at least a portion of information presented on the internal display of the headset.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for providing awareness of privacy-related activities, the method comprising:
   determining a privacy level associated with a user of an extended reality environment;
   presenting, using an internal display of a headset, one or more internal indicators identifying a location of a bystander located in a real-world environment, wherein a level of detail of each internal indicator is based on the privacy level associated with the user; and
   presenting, using an external display, one or more external indicators that include a monitoring indicator depicting at least a portion of information presented on the internal display of the headset.

2. The computer-implemented method of claim 1, further comprising displaying, using the internal display of the headset, a privacy level indicator that is based on the privacy level associated with the user.

3. The computer-implemented method of claim 2, further comprising displaying the privacy level indicator in the real-world environment using a light emitting diode (LED), wherein the privacy level indicator has a color that corresponds to the privacy level.

4. The computer-implemented method of claim 1, wherein the privacy level is determined based on user input.

5. The computer-implemented method of claim 1, wherein the privacy level is determined based on a task being performed by the user in the extended reality environment.

6. The computer-implemented method of claim 1, wherein the one or more internal indicators are determined based on the privacy level.

7. The computer-implemented method of claim 6, wherein the one or more internal indicators are determined based on the privacy level using a user-specified indicator configuration that associates the privacy level with the one or more internal indicators.

8. The computer-implemented method of claim 1, wherein the one or more internal indicators comprise a side location indicator, wherein a location of the side location indicator on the internal display indicates a location of the bystander relative to the user.

9. The computer-implemented method of claim 8, wherein the side location indicator is displayed in response to determining that the privacy level associated with the user is a low privacy level.

10. The computer-implemented method of claim 1, wherein the one or more internal indicators comprise an overhead location indicator displaying a location of the bystander relative to the user in a two-dimensional overhead view.

11. The computer-implemented method of claim 10, wherein the overhead location indicator is displayed in response to determining that the privacy level associated with the user is a medium privacy level.

12. The computer-implemented method of claim 1, wherein the one or more internal indicators comprise a view of the bystander in the real-world environment, and wherein the view is displayed at a location on the internal display, wherein the location on the internal display corresponds to a location of the bystander in a field of view of the user.

13. The computer-implemented method of claim 12, wherein the view of the bystander is displayed in response to determining that the privacy level associated with the user is a high privacy level.

14. The computer-implemented method of claim 1, wherein the monitoring indicator includes a representation of the one or internal indicators that are being presented to the user.

15. The computer-implemented method of claim 1, wherein the one or more external indicators further include a user activity indicator representing one or more activities of the user, wherein a level of detail of the user activity indicator is based on the privacy level associated with the user.

16. The computer-implemented method of claim 15, wherein the user activity indicator includes a description of an activity in which the user is engaged.

17. The computer-implemented method of claim 16, wherein the description of the activity in which the user is engaged is displayed in response to determining that the privacy level associated with the user is a low privacy level.

18. The computer-implemented method of claim 15, wherein the user activity indicator includes a type of an activity in which the user is engaged, and the type of the activity is displayed in response to determining that the privacy level associated with the user is a medium privacy level.

19. One or more non-transitory computer-readable media storing instructions that, when executed by one or more processors, cause the one or more processors to perform the steps of:
   determining a privacy level associated with a user of an extended reality environment;
   presenting, using an internal display of a headset, one or more internal indicators identifying a location of a bystander located in a real-world environment, wherein a level of detail of each internal indicator is based on the privacy level associated with the user; and
   presenting, using an external display, one or more external indicators that include a monitoring indicator depicting at least a portion of information presented on the internal display of the headset.

20. A system, comprising:
   one or more memories that store instructions, and one or more processors that are coupled to the one or more memories and, when executing the instructions, are configured to perform the steps of:
- determining a privacy level associated with a user of an extended reality environment;
- presenting, using an internal display of a headset, one or more internal indicators identifying a location of a bystander located in a real-world environment, wherein a level of detail of each internal indicator is based on the privacy level associated with the user; and
- presenting, using an external display, one or more external indicators that include a monitoring indicator depicting at least a portion of information presented on the internal display of the headset.

* * * * *